Patented June 26, 1934

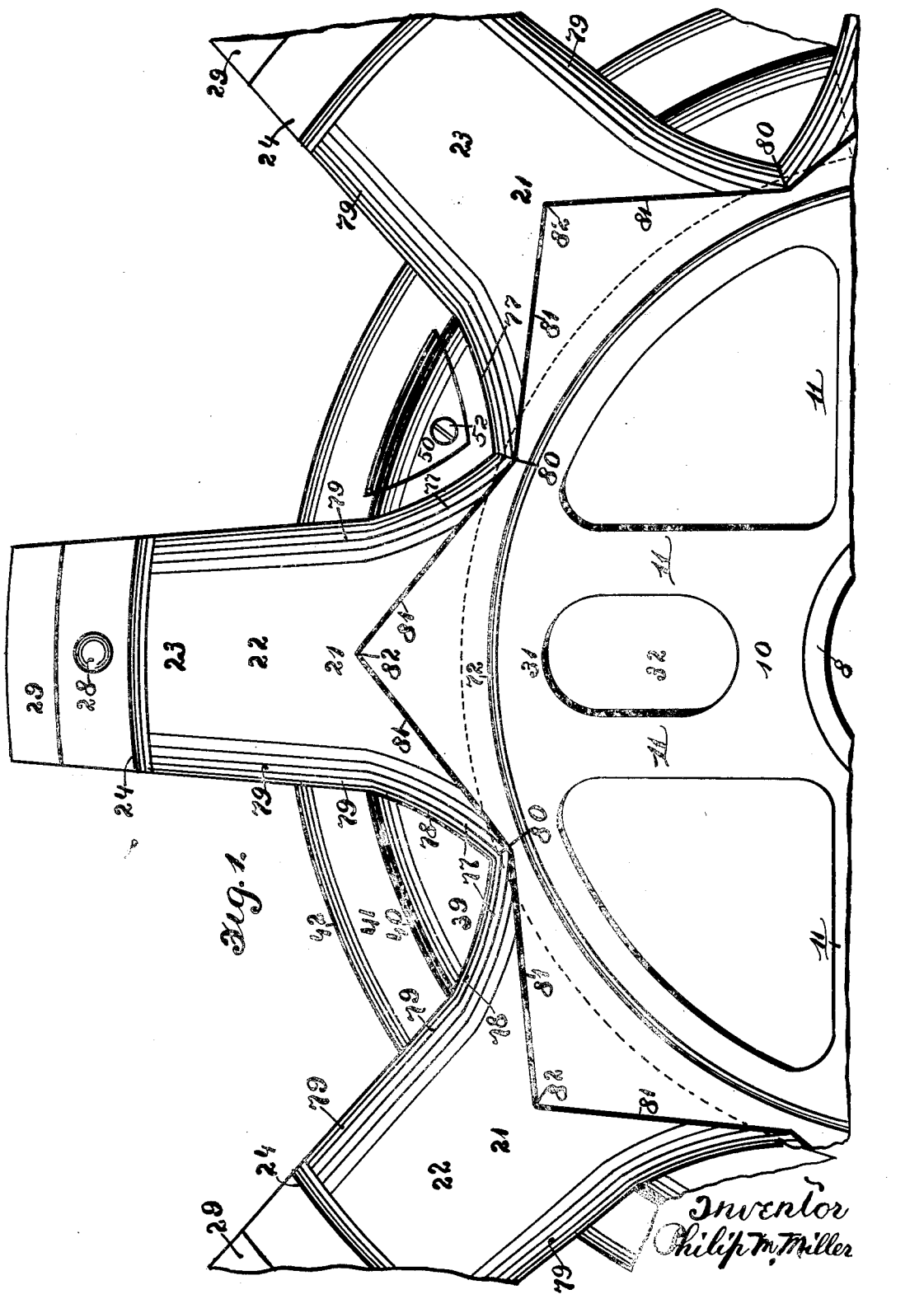

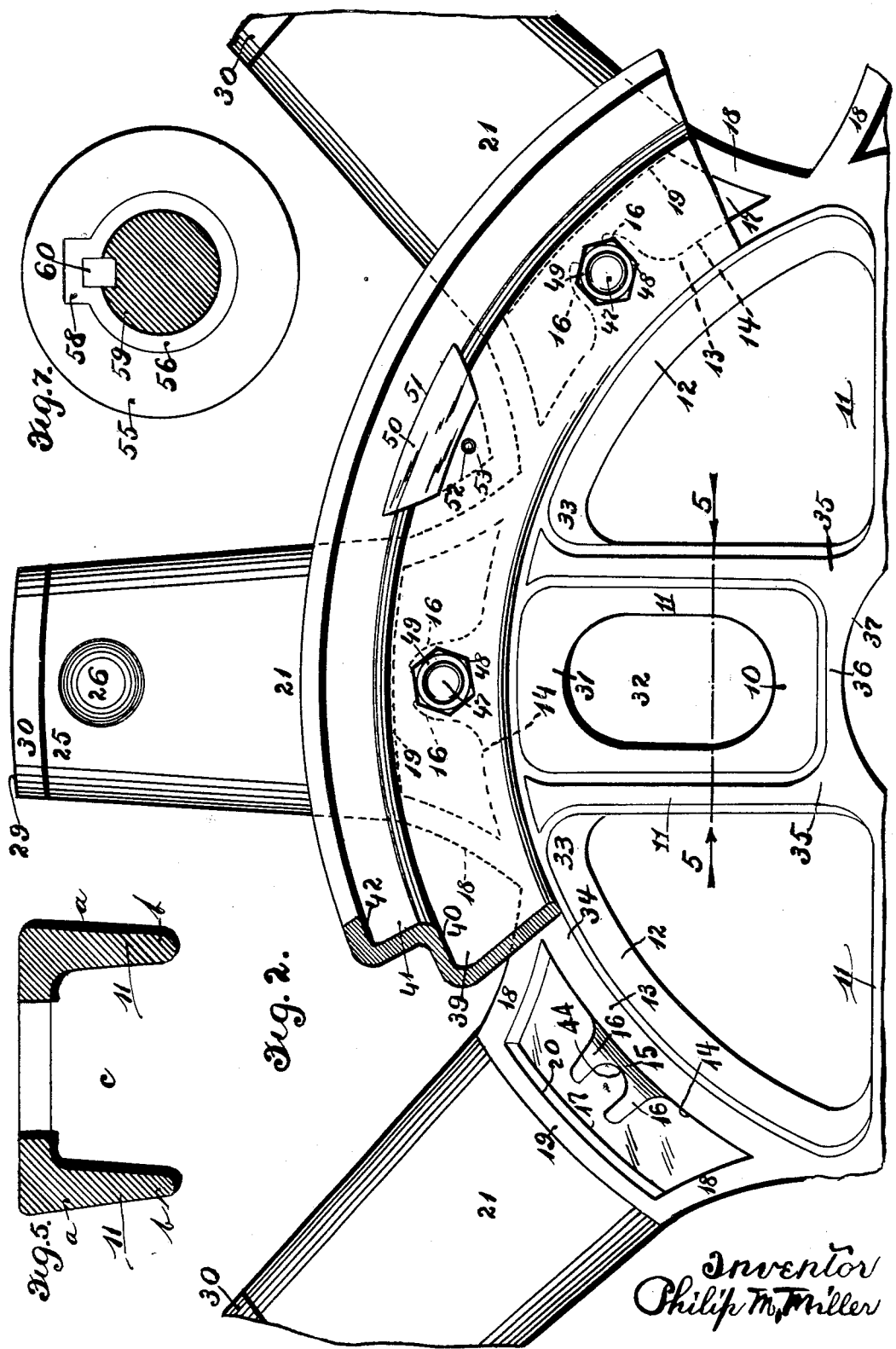

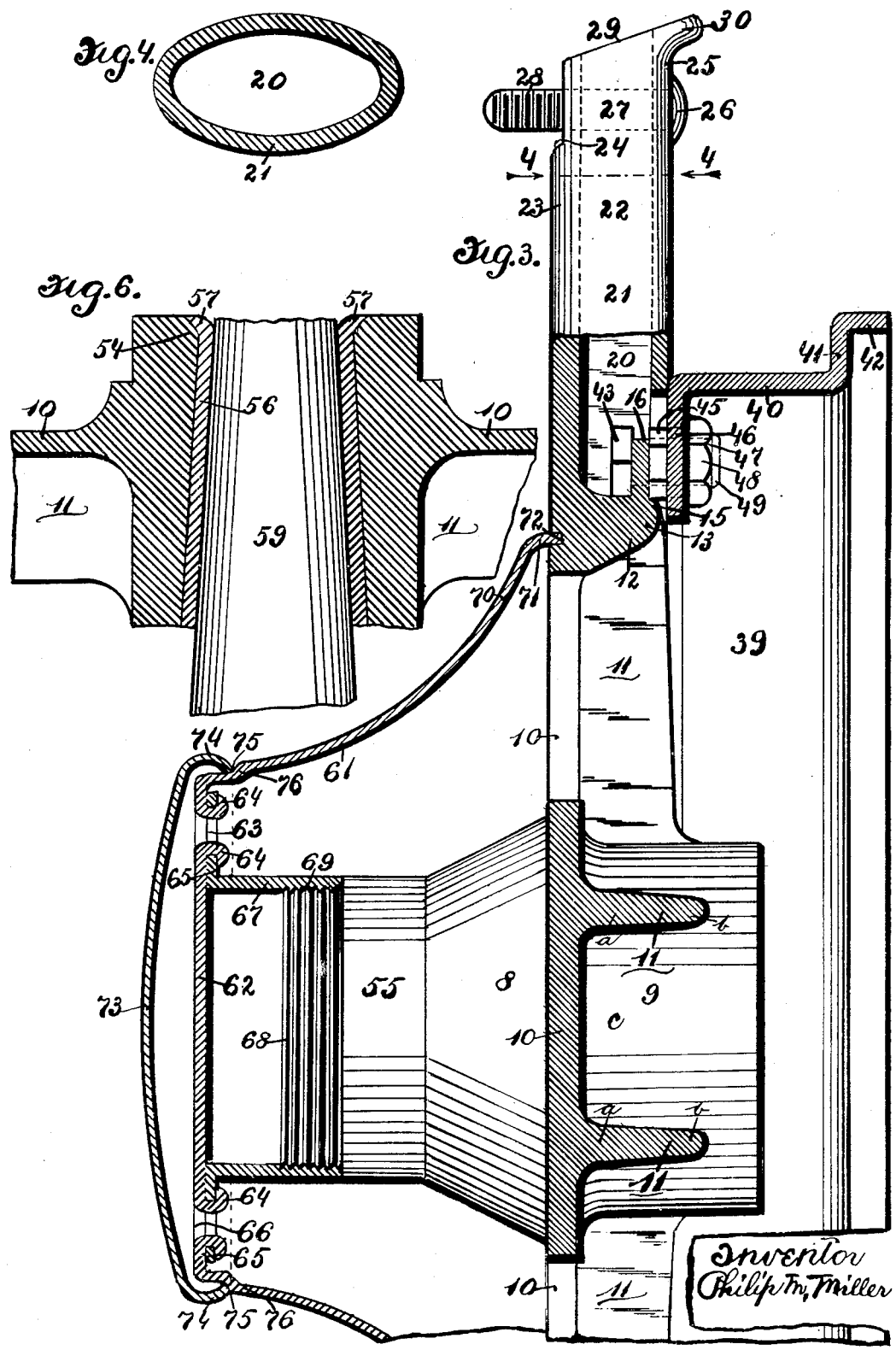

1,964,129

UNITED STATES PATENT OFFICE 1,964,129

CAST WHEEL

Philip M. Miller, Cleveland, Ohio

Application January 5, 1931, Serial No. 506,584

6 Claims. (Cl. 301—6)

This invention relates to cast metal automobile wheels of the type which simulate in general appearance the conventional wood artillery type wheel, and has for its principal object, to provide a metal wheel assembly adapted for use with light and heavy duty passenger and commercial motor driven vehicles, which altho embodying a spider member of cast metal is relatively light yet strong and rugged and through the interior parts of which air is permitted to circulate to thereby continually cool the construction and dissipate heat generated by road friction, the manufacture of which may be easily carried out and will result in a superior product, which will possess all the advantages of a cast metal wheel and at the same time will not be subject to the objections which have generally been encountered in the manufacture of such wheels.

The above and other objects and advantages of the invention, including various novel constructions of parts, will be apparent from the following description of the illustrative embodiment shown in the accompanying drawings, in which—

Figure 1 is an outboard side elevational view of a portion of a wheel embodying my invention;

Fig. 2 is a view in inboard side elevation of a portion of the wheel;

Fig. 3 is a vertical cross section of a portion of the wheel;

Fig. 4 is a cross section of one of the spokes of the spider member taken on the line 4—4, Fig. 3;

Fig. 5 is a cross section of one of the ribs of the construction shown in Fig. 2, taken on the line 5—5 as indicated by the arrows;

Fig. 6 is a longitudinal section of the hub portion of the wheel;

Fig. 7 is a front end view of the hub and its component parts showing the interlocking of one with another to provide a driving connection therebetween.

The invention in the form illustrated is designated by corresponding characters referring to parts thereof, in which the hub body of the spider structure comprises the front portion 8, rear portion 9, and integral wall 10 which is concentric with the circular faces of the portions 8 and 9 and is circumferentially formed with a series of spaced channeled ribs or columns 11 which are of U-shape for the purpose of decreasing the consumption of material in the producing of the spider structure and to permit air to circulate through the central part of the wheel. Each rib or column is integral with a curved or tapered face 12, which extends from the outer face to the inner face of the spider structure to provide a transverse sturdy body 13. As particularly shown in Fig. 2, the body 13 is provided circumferentially with spaced horizontal floors 14 each extended laterally and merged with the outer wall of the adjacent spoke which will hereinafter be described. Each floor 14 is provided at its inner side 15 with upright portions 16 which face the opening 17 formed by the inner portion of the floor 14, side curved portions 18 and upper portion 19, thereby providing the opening 20 in the spoke 21. Thus each spoke is provided with a continuous channel having communication with the opening 17. I prefer to make the spokes 21 oval-shape in cross section as particularly shown in Fig. 4 so that they will simulate the appearance of a wood spoke. The outer face 23 of each spoke body 22 is provided with a seat 24 while at the inner side 25 is fixed a bolt 26 which is passed transversely through the portion 27 of the spoke and terminates in a threaded projection 28 for engagement with a clamp member when seated on the seat 24 and engaged with a demountable tire-carrying rim, not shown, but which is adapted to be mounted on the inclined face 29 laterally outwardly extending from the inner side ledge 30 which is integrally provided with the inner face 25.

The wall 31 of each rib or column 11 is provided, as particularly shown in Figs. 1 and 2, with an opening 32, which may be of any desired shape. The wall 31, while being integral with the portions 12 and arched body 13 at the outer or upper end, is continuous to the inner or hub portion 10, so that the side walls, as particularly shown in Figs. 2 and 3, are spaced, one from another, and each extends laterally inwardly on a taper beginning at $a$ and terminating at $b$, and a channel $c$ is formed between the inner faces thereof. The dimension of the channel $c$ is such as will provide a strong central or hub member. The advantage of having the side walls of each rib tapered as shown is for two-fold purpose of eliminating metal and to enable the removal of the casting from the sand at the foundry operations. The spacing of the walls of the ribs does not detract from the strength of the structure since the walls are integral with parts at the opposite ends thereof and form solid side supports, the structural strength of which is also not minimized by the removal of material from the front walls 31. In order to increase the structural strength of each rib or column 11 as a whole, a fillet 33 is provided and merged with the adjacent portion 34, while the inner or hub end is moulded with a fillet 35 on each side thereof which is integral with the floor portion 36 of the hub body 37.

I employ a brake drum having a relatively short web portion which is secured to the spider member in a manner such as will coact therewith to reinforce the wheel as a whole. Since the material embodied in the drum is thus reduced to a minimum, the entire member may be made of high carbon steel or like efficiently-operating brake material at a relatively low cost. Referring to Figs. 1 and 2, the drum comprises the angle member 39 having an integral transversely extended circumferential flange 40 projected laterally and merged with a flange 41. The member 39 is aligned with the circumferential sturdy body 13 of the spider structure and extends outwardly radially beyond the arched wall between the spokes. Previously to aligning the angle member with the body 13, a short bolt 43 is positioned with its shank engaged in a recess 44 formed by the side projections 16 extended from the side 14, and a nut 45 is then applied to the threaded portion thereof. By tightening the nut on the threaded portion of the bolt, the nut is moved into wedged contact with the outer faces of the projections 16, so that the bolt 43 is held rigid in the recess 44. As a result of so fastening each bolt in the recess, the bolts form rigid members and extend laterally. Each projected threaded portion of the fastened bolts is then inserted through a large opening in the outer vertical wall of the angle member 39 with nut 45 engaged with the adjacent opening 46 in the angle member. Having thus positioned the angle member in relation to the projected nuts and portions of the bolts, another nut 48 is secured to the free threaded portion 47 of the bolt so as to make a tight engagement between the angle member and the circumferential sturdy body 13, which portion 47 is pinned or otherwise spun to lock the nut on the bolt, as particularly shown at 49. The drum or angle member 39, due to its short web wall construction, may be rolled or stamped of metal that contains carbon as high as fifty or sixty or even a higher percentage, in accordance with the requirement for the individual vehicle. By mounting of the drum, as shown, remote from the center of the spider member, the spider and drum cooperate to strengthen each other and are better adapted to withstand stresses and strains than is the case where the web wall of the drum is extended and engaged with the spider at a point adjacent the hub of the latter.

For the purpose of examining the condition of the brake lining of the braking mechanism of the vehicle, I provide a removable plate 50 secured over the opening 51 by means of the screw 52 fastened in the body 53 of the vertical wall of the angle member 39, as particularly shown in Figs. 1 and 2. When the screw is unfastened the plate is removed, thus permitting to observe, through the opening 51, the interior of the braking mechanism.

Referring to Figs. 6 and 7, in the bore 54 of the hub portion 55 is secured a tubular sleeve 56 which is crimped at the outer end against the side of the hub as shown at 57. The tubular member 56 is provided with a channeled projection 58 extended throughout the length thereof. Within the tubular member is positioned the conventional axle 59 which is keyed by member 60 engaged in the registering channels in the respective member and axle to provide a driving connection therebetween. The tubular member extends throughout the length of the entire hub, and the hub, tubular member and axle constitute together a unitary driving member. The tubular sleeve member is preferably formed of hard wear material that contains a relatively high percentage of carbon.

For the purpose of excluding extraneous substances from the interior of the completed wheel construction, I provide a deeply drawn shell 61 having a front wall 62. The sides of the front of the shell are pressed in as shown at 63 to form bent-over portions 64 which are engaged with the inner face of a grease retainer member 65 thereby fastening both the shell and grease retainer together and providing an opening 66 on each side thereof for engagement with a tool for mounting and demounting the assembled shell and grease member in relation to the wheel.

The assembled construction as shown at 67 is threaded on the neck 68 as shown at 69, thereby bringing the inner portion 70 of the shell into tight engagement with the side of the wheel with the end 71 engaged in a groove 72 provided in the face of the wheel. A removable cap member 73 is provided and has an inturned beaded edge 74 seated against a shoulder 75 formed at the outer portion 76 of the shell.

The spokes 21 and peripheral spider wall are constructed to provide beauty of design and great strength. The inner ends of the spokes are merged together and provided with arched portions 77, each of which extend outwardly and merge with a continuous arched portion 78 which is merged with a tapered portion 79. At the inner ends of the adjacent spokes are merged joints 80, one between two spoke ends, which are fused with the arched portions 77. Extending outwardly, angularly in opposite directions, is a line 81 terminating at the middle of the spokes as particularly shown at 82. The lines 81 are arranged circumferentially on the ends of the spokes and merge at one point in the middle of the spoke. The arched side portions of the ends of the spokes and the angularly extended lines simulate the appearance of wood spokes when collectively formed into an artillery-type wheel.

While one illustrative embodiment has been described in detail, it is not my intention to limit the scope of the invention to that particular embodiment, or otherwise than by the terms of the appended claims.

Having thus described my invention, what I desire to secure by Letters Patent, is:

1. A metal wheel for motor vehicles, comprising a main free spoked spider member adapted to be cast as an integral unit and formed with a hub, ribs projecting radially from said hub and merging with an annular thickened transverse wall which forms the base of the wheel spokes, the periphery of said wall being arched circumferentially and said arches merging into a series of relatively short tapering tubular projections defining the spokes of the wheel, the base of each spoke being open toward the inner side of the wheel, a drum member secured to the periphery of said wall on the inner side of the wheel and a shell member secured to said hub and covering the outer side of the wheel within the boundary of said wall, a chamber being formed around the hub and communicating with the interior of said spokes at the bases thereof whereby a light, open, ventilated metal wheel is provided which simulates the appearance of an artillery type wheel.

2. A metal wheel for motor vehicles, comprisng a main spoked spider member adapted to be cast as an integral unit and formed with a transversely extended hub, open wall ribs projecting from said hub and merging into an annular thickened transverse wall which forms the base of the wheel spokes, the periphery of said wall being arched and radially extended between said arches to form relatively short tubular spokes, each spoke being hollow and at its base being open toward the inner side of the wheel, the peripheral portion of said wall being formed with circumferentially spaced securing lugs which project radially into said openings, a brake drum having a reduced web portion secured to said lugs leaving the central part of the wheel open around said ribs, and a shell member secured over the outer side of said wheel, forming a chamber around said hub and ribs.

3. A metal wheel for motor vehicles, comprising a main spoked spider member adapted to be cast as an integral unit and formed with a transversely extended hub, ribs projecting radially from said hub and merging into an annular thickened transverse wall which forms the base of the wheel spokes, the periphery of said wall being extended radially in a series of tapering projections defining the spokes of the wheel, the spokes being of tubular formation and opening at their bases toward the inner side of the wheel, a drum member having a relatively short web which fits against the inner side of said spider member over the open bases of the spokes, and means for securing said drum web to the peripheral portion of said wall.

4. In a wheel for motor vehicles, a main spoked spider member, a drum member secured to said spider member, and a removable inspection plate mounted in the wall of said drum between the spokes, to permit inspection of the brake lining without demounting any of the wheel parts.

5. A metal wheel for motor vehicles, comprising a main spoked spider member cast as an integral unit and formed with a transversely-extended hub barrel, ribs projecting radially from said hub and merging into an annular body wall, providing a central nave area which is open for the greater part of the wheel diameter, said ribs being of channel shape with side walls which are extended transversely of the hub and body wall, said wall forming the base of the spokes of the spider and having its periphery arched and extended radially between said arches into a series of tubular projections which define the spokes and have free spoke ends, the inboard wall of the spokes at the bases thereof being formed with openings and the periphery of said spider body wall being formed with fastening lugs which project radially into said openings, a brake drum having a reduced web flange which is secured to the spider by fastening bolts which engage said lugs, and a nave-covering shell attached to the end of said hub and flaring radially with its edge engaged in a groove formed in said annular body wall, whereby a light, strong, open ventilated cast metal wheel is provided which simulates the appearance of an artillery type wheel.

6. In a wheel for motor vehicles, a main spoked spider member, a drum member secured to said spider member and provided with a transverse peripheral brake flange, and a removable inspection plate mounted in the wall of the drum adjacent said flange at a point which lies between two of the spokes of the spider member so as to be accessible from the outboard side of the wheel, to thereby permit convenient inspection of brake linings and coacting members interior of the drum without demounting any of the wheel parts.

PHILIP M. MILLER.